US007947195B2

United States Patent
Shiao et al.

(10) Patent No.: US 7,947,195 B2
(45) Date of Patent: May 24, 2011

(54) POLISHING SLURRY

(75) Inventors: Danny Zhenglong Shiao, Shanghai (CN); Andy Chunxiao Yang, Shanghai (CN)

(73) Assignee: Anji Microelectronics (Shanghai) Co., Ltd., Shanghai (CN)

( * ) Notice: Subject to any disclaimer, the term of this patent is extended or adjusted under 35 U.S.C. 154(b) by 316 days.

(21) Appl. No.: 11/920,690

(22) PCT Filed: May 15, 2006

(86) PCT No.: PCT/CN2006/000974
§ 371 (c)(1),
(2), (4) Date: Nov. 19, 2007

(87) PCT Pub. No.: WO2006/122492
PCT Pub. Date: Nov. 23, 2006

(65) Prior Publication Data
US 2009/0121178 A1 May 14, 2009

(30) Foreign Application Priority Data

May 17, 2005 (CN) .......................... 2005 1 0025867

(51) Int. Cl.
*C09K 13/00* (2006.01)
(52) U.S. Cl. ..................................................... 252/79.1
(58) Field of Classification Search ............... 252/79.1; 51/309, 307; 427/212, 213, 215, 220, 221; 106/3; 216/93
See application file for complete search history.

(56) References Cited

U.S. PATENT DOCUMENTS

| 4,789,648 | A | 12/1988 | Chow et al. |
| 4,956,313 | A | 9/1990 | Cote et al. |
| 5,137,544 | A | 8/1992 | Medellin |
| 5,157,876 | A | 10/1992 | Medellin |
| 5,354,490 | A | 10/1994 | Yu et al. |
| 5,391,258 | A | 2/1995 | Brancaleoni et al. |
| 5,527,423 | A | 6/1996 | Neville et al. |
| 6,461,227 | B1 * | 10/2002 | Fang ............................. 451/41 |
| 2004/0224155 | A1 * | 11/2004 | Barron et al. ................ 428/402 |
| 2005/0090109 | A1 * | 4/2005 | Carter et al. ................. 438/692 |

FOREIGN PATENT DOCUMENTS

| CN | 1654585 | 8/2005 |
| JP | 2003-277731 | 10/2003 |

OTHER PUBLICATIONS

International Search Report dated Jul. 20, 2006.

* cited by examiner

*Primary Examiner* — Nadine G Norton
*Assistant Examiner* — Patti Lin
(74) *Attorney, Agent, or Firm* — Jacobson Holman PLLC

(57) ABSTRACT

The present invention discloses a polishing slurry, wherein said polishing slurry comprises a carrier and functionalized alumina grains. The polishing slurry, which comprises functionalized alumina grains having desirable dispersibility, has desirable stability and is able to lower the defect rate of the substrate surface, improve the surface quality, decrease the total metal loss and enlarge the variation range of the technical parameters.

8 Claims, No Drawings

POLISHING SLURRY

This is a national stage of International Application No. PCT/CN2006/000974 filed on May 15, 2006 and published in Chinese.

TECHNICAL FIELD

The present invention relates to a polishing agent, in particular, to a polishing slurry comprising functionalized alumina grains.

BACKGROUND ART

In the manufacture of integrated circuits, the standards on interconnecting technology are being upgraded, which require one layer to be deposited on another, resulting in an irregular topography formed on the substrate surface. One planarization method used in prior art is chemical-mechanical polishing (CMP). CMP is a process that uses a mixture comprising abrading grains and a polishing pad to polish the surface of an integrated circuit. In a typical chemical-mechanical polishing method, a substrate directly contacts a rotating polishing pad and a pressure is applied on the back of the substrate by a load. During polishing, the pad and the platform are rotating, the downward pressure applied on the back of the substrate is kept, an abrading agent and a chemically active solution (typically called as a slurry) are applied on the pad, and a chemical reaction occurs between the slurry and the polishing film, so that the process of polishing is initiated.

A CMP polishing slurry typically comprises abrading grains, for example, slurries prepared from alumina abrading grains, sulfuric acid, nitric acid, acetic acid and deionized water as disclosed in U.S. Pat. No. 4,789,648 to Beyer et. al. U.S. Pat. No. 5,391,258 discloses a slurry for polishing a composite of a metal and silicon dioxide, which comprises water media, abrading grains and anions for controlling the speed at which silicon dioxide is removed. Other polishing slurries for CMP are described in U.S. Pat. No. 5,527,423 to Neville et. al., U.S. Pat. No. 5,354,490 to Yu et. al., U.S. Pat. No. 5,157,876 to Medellin et. al., U.S. Pat. No. 5,137,544 to Medellin et. al., and U.S. Pat. No. 4,956,313 to Cote et. al.

As insulating materials having low dielectric constants k are introduced into chips, there is an urgent need for improving conventional CMP polishing slurries, since most of the materials having low dielectric constants are readily cracked. With respect to CMP slurries, it is desired to decrease the concentration of the abrading grains and reduce the downward pressure, in order to eliminate or minimize the defects while keeping a high removing speed.

SUMMARY OF INVENTION

The object of the present invention is to provide a polishing slurry, comprising a carrier and functionalized alumina grains. Preferably, the carrier is water.

Preferably, the average grain size of the functionalized alumina grains is 0.03-0.2 μm, and more preferably 0.03-0.1 μm.

The functionalized alumina grains are DISPAL and DISPERAL series etc., obtainable from Sasol Corp. of Germany, which comprise such functionalized groups as acetic acid group, toluene sulphonate group, dodecylbenzene sulphonate group or silanyl, etc.

In addition to acting as abrading grains, the functionalized alumina grains react with the metal substrate to form a stable metal ionic complex. Thus, the functionalized alumina grains can provide the metal substrate with mechanical force and chemical force, so that the grain content of the polishing slurry can be decreased, and the downward pressure can be reduced during the polishing. As a result, the quality of the substrate surface is improved, the total metal loss is minimized, the variation range of the technical parameters are enlarged, and the defect rate is minimized.

The polishing slurry may further comprise an oxidant, a complexing agent, a surface passivating agent and/or a surfactant.

The mass percentages, based on the total mass of the composition, are 1-30% for the functionalized alumina grains, 0.1-15% for the oxidant, 0.01-10% for the complexing agent, 0.001-5% for the surface passivating agent, 0.001-10% for the surfactant and the balance for the carrier.

The oxidant is hydrogen peroxide, ferric nitrate, organic peroxides and/or inorganic peroxides; the surfactant is a cationic, anionic, zwitterionic, neutral and/or high molecular surfactant; the complexing agent is a compound containing oxygen, nitrogen, sulfur or phosphor.

The surfactant is preferably a fatty alcohol-polyoxyethylene ether, polyoxyethylene alkylamine, alkanolamide and/or FA/O surfactant; the complexing agent is preferably a compound containing hydroxyl, carboxyl, sulfate group, sulphonate group, phosphonate group, hydroxylamino, amine salt and/or amine group.

The polishing slurry may further comprise one or more of a dispersing agent, a catalyst and a pH mediator.

The beneficial effects according to the present invention lie in that the polishing slurry according to the present invention has desirable stability, the functionalized alumina grains have desirable dispersibility, and the polishing slurry may lower the defect rate of the substrate surface, improve the surface quality, decrease the total metal loss and enlarge the variation range of the technical parameters of the process.

BEST MODE FOR CARRYING OUT THE INVENTION

The following are preferred examples according to the present invention, provided as a detailed illustration of the technical designs according to the present invention.

EXAMPLE 1

10 wt % alumina p-toluene sulphonate grains having an average grain size of 0.1 μm, 5.0 wt % hydrogen peroxide, 0.1 wt % benzotriazole, 0.5 wt % citric acid, 0.1 wt % lauryl alcohol-polyoxyethylene ether, and the balance for water.

Downward pressure: 1 psi; rotating speed of the polishing plate: 50 rpm; rotating speed of the polishing head: 75 rpm; flow rate of the polishing liquid: 150 mL/min.

EXAMPLE 2

5 wt % alumina dodecylbenzene sulphonate grains having an average grain size of 0.13 μm, 2.5 wt % hydrogen peroxide, 0.05 wt % benzotriazole, 0.01 wt % oxalic acid, 0.01 wt % sodium dodecylsulphonate, and the balance for water.

Downward pressure: 1 psi; rotating speed of the polishing plate: 50 rpm; rotating speed of the polishing head: 75 rpm; flow rate of the polishing liquid: 150 mL/min.

EXAMPLE 3

10 wt % silanyl alumina grains having an average grain size of 0.075 μm, 1 wt % hydrogen peroxide, 0.001 wt % BTA, 0.1 wt % tartaric acid, 0.01 wt % polyoxyethylene ether, and the balance for water.

Downward pressure: 1 psi; rotating speed of the polishing plate: 50 rpm; rotating speed of the polishing head: 75 rpm; flow rate of the polishing liquid: 150 mL/min.

EXAMPLE 4

1 wt % alumina p-toluene sulphonate grains having an average grain size of 0.1 μm, 1.0 wt % ammonia thiosulfate, 0.1 wt % BTA, 1 wt % amberic acid, 10 wt % poly(vinyl alcohol), and the balance for water.

Downward pressure: 1 psi; rotating speed of the polishing plate: 50 rpm; rotating speed of the polishing head: 75 rpm; flow rate of the polishing liquid: 150 mL/min.

EXAMPLE 5

1 wt % silane-functionalized alumina grains having an average grain size of 0.1 μm, 5 wt % hydrogen peroxide, 0.1 wt % BTA, 2 wt % EDTA, 0.1 wt % copolymer of acrylic acid and acrylate, and the balance for water.

Downward pressure: 1 psi; rotating speed of the polishing plate: 50 rpm; rotating speed of the polishing head: 75 rpm; flow rate of the polishing liquid: 150 mL/min.

EXAMPLE 6

5 wt % alumina dodecylbenzene sulphonate grains having an average grain size of 0.1 μm, 5 wt % hydrogen peroxide, 0.1 wt % BTA, 1.0 wt % butyl diamine, 0.001 wt % stearamide, and the balance for water.

Downward pressure: 1 psi; rotating speed of the polishing plate: 50 rpm; rotating speed of the polishing head: 75 rpm; flow rate of the polishing liquid: 150 mL/min.

EXAMPLE 7

30 wt % alumina p-toluene sulphonate grains having an average grain size of 0.03 μm, 0.5 wt % hydrogen peroxide, 5 wt % 5-hydroxyl benzotriazole, 0.5 wt % oxalic acid, 0.01 wt % ethylene glycol amine dodecylsulfate, and the balance for water.

Downward pressure: 1 psi; rotating speed of the polishing plate: 50 rpm; rotating speed of the polishing head: 75 rpm; flow rate of the polishing liquid: 150 mL/min.

EXAMPLE 8

2 wt % alumina dodecylbenzene sulphonate grains having an average grain size of 0.2 μm, 15 wt % hydrogen peroxide, 0.01 wt % BTA, 10 wt % EDTA, 5 wt % polyoxypropylene glycerol ether, and the balance for water.

Downward pressure: 1 psi; rotating speed of the polishing plate: 50 rpm; rotating speed of the polishing head: 75 rpm; flow rate of the polishing liquid: 150 mL/min.

The invention claimed is:

1. A polishing slurry, comprising a carrier and functionalized alumina grains, wherein the functionalized alumina grains comprise one or more functionalized groups selected from toluene sulphonate group and dodecylbenzene sulphonate group.

2. The polishing slurry according to claim 1, wherein the functionalized alumina grains have an average grain size of 0.03-0.2 μm.

3. The polishing slurry according to claim 2, wherein the functionalized alumina grains have an average grain size of 0.03-0.1 μm.

4. The polishing slurry according to claim 1, wherein the polishing slurry further comprises an oxidant, a complexing agent, a surface passivating agent and/or a surfactant.

5. The polishing slurry according to claim 4, wherein the mass percentages, based on the total mass of the composition, are 1-30% for the functionalized alumina grains, 0.1-15% for the oxidant, 0.01-10% for the complexing agent, 0.1-5% for the surface passivating agent, 0.001-10% for the surfactant and the balance for the carrier.

6. The polishing slurry according to claim 4, wherein the polishing slurry may further comprise one or more of a dispersing agent, a catalyst and a pH mediator.

7. The polishing slurry according to claim 4, wherein the oxidant is hydrogen peroxide, ferric nitrate, organic peroxides and/or inorganic peroxides; the surfactant is a cationic, anionic, zwitterionic, neutral and/or polymer surfactant; the complexing agent is a compound containing oxygen, nitrogen, sulfur or phosphor.

8. The polishing slurry according to claim 7, wherein the surfactant is a fatty alcohol-polyoxyethylene ether, polyoxyethylene alkylamine, alkanolamide and/or FA/O surfactant; the complexing agent is a compound containing hydroxyl, carboxyl, sulfate group, sulphonate group, phosphonate group, hydroxylamino, amine salt and/or amine group.

* * * * *